Dec. 22, 1942.   T. J. HEALY   2,305,699
UNIVERSAL COUPLING
Filed Sept. 29, 1941
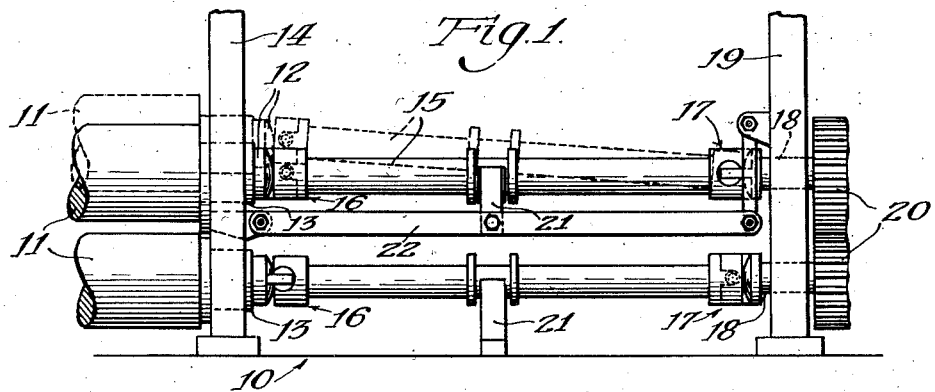
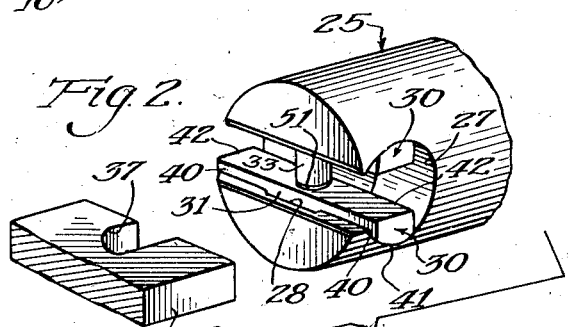
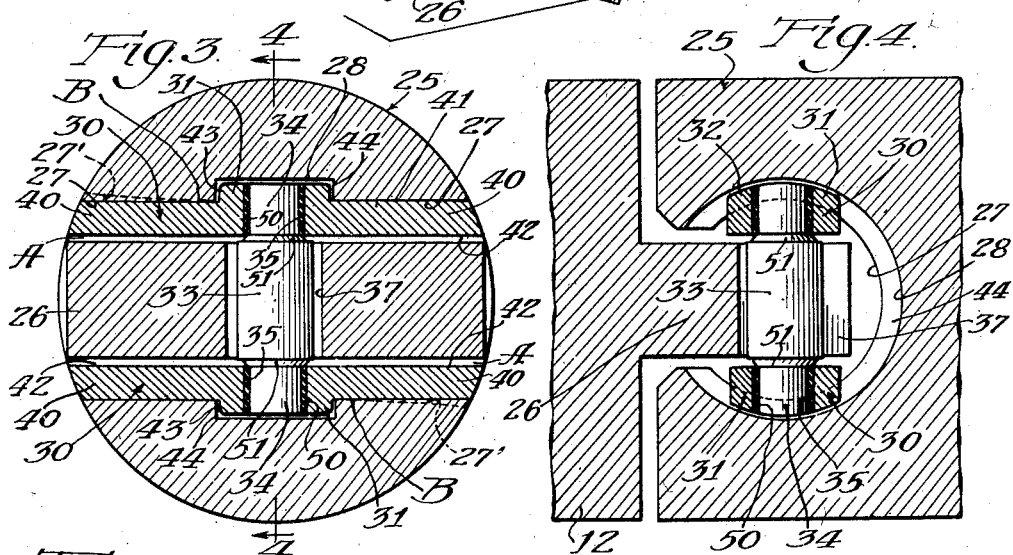
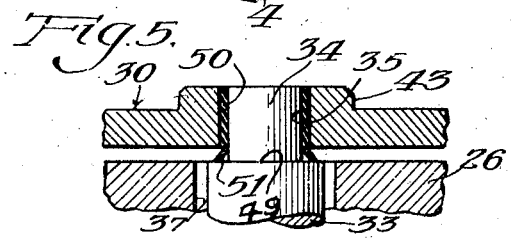
Inventor:
Thomas J. Healy
By Wallace & Cannon
Attorneys.

Patented Dec. 22, 1942

2,305,699

UNITED STATES PATENT OFFICE 2,305,699

UNIVERSAL COUPLING

Thomas J. Healy, Baltimore, Md., assignor to The American Brake Shoe and Foundry Company, Wilmington, Del., a corporation of Delaware Application September 29, 1941, Serial No. 412,752

7 Claims. (Cl. 64—7)

This invention relates to bearings and particularly to slipper bearing structures employed in universal joint driving connections and the like.

In the transmission of power by rotating shafts it is often desirable to employ universal joints for coupling shafts end to end to permit continuous transmission of torque from a driving shaft to a driven shaft which may be angularly disposed with respect to the driving shaft. Universal joints for such use may comprise a female member formed on or secured to an end of one of the shafts and a male member similarly provided on the adjacent end of the other shaft, the male member being insertable into the female member to afford a driving connection when the shafts are assembled in operative relation to each other. When shafts which are thus connected are not in alignment longitudinally, the male and female members must be so coupled as to enable relative movement of these members to take place as the shafts are rotated, and in accomplishing this purpose means including what are known as slipper bearings are interposed between the male and female members to provide for relative pivoted movement of these members about right angularly related axes.

Universal joints of this general character are usually constructed so that the male member embodies a flat fish-tail or tongue, and a bifurcation is provided in the female member to receive this tongue. The opposed faces of the branches of the bifurcation in the female member are arcuately recessed transversely across the female member and the slipper bearings are in the form of segments of a cylinder so that they may be disposed in the arcuate bearing surfaces afforded by the aforesaid recesses, two such segmental slipper bearings being employed in each universal joint and being disposed one on each side of the male tongue with their cylindrical surfaces conforming to the aforesaid arcuate bearing surfaces and their flat faces engaging opposite faces of the tongue. A centrally located bearing or spacing pin interconnects the slipper bearings and is adapted to be received in a bifurcation or other suitable opening in the tongue of the male member to thereby afford a pivotal interconnection. As the male and female members are rotated, torque is transmitted from one to the other through the medium of the slipper bearings and the tongue and upon disalignment of the male and female members, relative pivotal movement about the bearing pin as a center and of the female member with respect to the cylindrical axis of the slipper bearings compensates for the disalignment.

In use it is found that the rotative force applied to each slipper bearing is not uniformly distributed throughout such bearing but is exerted substantially entirely upon that portion of the bearing disposed on one or the other side of the bearing pin, depending upon the direction of rotation and whether it is the male or female member which does the driving. Moreover, this force tends to be unequally distributed along that portion of the slipper bearing which is under stress, becoming progressively greater as the distance from the bearing pin increases. Due to this non-uniform distribution of the rotational forces acting upon the slipper bearings, there is a tendency to cause comparatively rapid wearing away of the more heavily stressed end section of each slipper bearing and its cooperating bearing surface in the female member, and substantially no wear of the portion of the bearing disposed on the other side of the bearing pin. There is also greater wear at the one end of the bearing than at the medial portion thereof, particularly where the driving and driven shafts are operated continuously in the same manner over long periods of time as in the case of steel rolling mills.

Heretofore, where conventional one-piece slipper bearings have been used with such worn coupling members, the driving torque applied to the stressed ends of the slipper bearings has tended to press these end portions of the slipper bearings into positions conforming with the worn female bearing surfaces. Such re-positioning of the slipper bearings tends in effect to shift the two slipper bearings from their normal right angle relation with respect to the intermediate bearing pin, but since the bearing pin in conventional slipper bearing assemblies is constrained against corresponding shifting movement, and is relatively tightly fitted into the boss opening and against the flat surface of the slipper bearings, such tendency to re-position the slipper bearings has in most instances produced substantial stresses and strains in the slipper bearings with attendant breakage of such bearings.

In view of the foregoing, it is a primary object of the present invention to decrease the likelihood of breakage of the slipper bearings and the like used in universal joints and similar devices, and particularly to accomplish this by resort to a novel construction which enables each bearing to adjust itself to changes in configuration of the supporting surface as the cooperating bearing parts wear away in service.

Yet another object is to enable the slipper bearings to properly adjust themselves rotatively to the configuration of the bearing surfaces within the female member.

A still further object is to decrease the stresses acting upon the medial portions of the slipper bearings and particularly to cushion the sockets in which the bearing pin is received to thereby minimize the effects of twisting and shearing forces acting upon the pin and the medial parts of the bearings as well as to relieve the strain upon the entire bearing structure; and further objects related to the foregoing are to cushion both the sockets of such slipper bearings and the spacing means to thereby enable shifting of the slipper bearings under stress to conform with the opposed bearing surfaces while assuring a predetermined relationship of the slipper bearings initially or during periods when load is not applied thereto.

Another object is to enable one-piece slipper bearings to be utilized in worn couplings without creation of objectionable or breaking stresses therein, and a further object related to the foregoing is to provide a novel slipper bearing of simple and economical construction, and which will be efficient and practical in use. Other and further objects of my invention will be apparent from the following description and claims and will be understood by reference to the accompanying drawing which, by way of illustration, shows a preferred embodiment and the principle thereof and what I now consider to be the best mode in which I have contemplated applying that principle. Other embodiments of the invention embodying the same or equivalent principle may be used and structural changes may be made as desired by those skilled in the art without departing from the present invention and the purview of the appended claims.

In the drawing,

Fig. 1 is a fragmental elevational view of a portion of a rolling mill equipped with bearings embodying the present invention;

Fig. 2 is an enlarged perspective view of a portion of a universal coupling equipped with slipper bearing embodying the present invention and showing the driving and driven elements of the coupling in separated relationship;

Fig. 3 is a transverse sectional view of one of the couplings shown in Fig. 1;

Fig. 4 is a longitudinal sectional view taken substantially on the line 4—4 on Fig. 3; and Fig. 5 is an enlarged cross-sectional view similar to Fig. 3 and showing additional details of structure.

The slipper bearings of the present invention may be expeditiously utilized in rolling mills of the character fragmentally shown in Fig. 1. The rolling mill 10 therein illustrated includes opposed rolls 11 having reduced end portions or pintles as 12 which are journaled in bearings as 13 carried by frame members as 14. As shown, the reduced portions 12 at one end of the pair of rolls 11 extend beyond the frame member 14 in which they are journaled and are connected to spindles 15 by means of universal joints or couplings generally designated 16. The spindles 15 are in turn connected by means of universal couplings 17 to stub shafts 18 journaled in a frame member 19. Gearing 20 carried by the stub shafts 18 serves to connect these stub shafts to suitable driving means (not shown) for the purpose of rotatively driving the spindles 15 and connected rolls 11. The spindles 15 are partially supported by thrust bearings 21 disposed midway between the frame members 14 and 19.

Inasmuch as the material upon which the rolls 11 operate may vary in thickness, provision is made for varying the vertical spacing of these rolls to accommodate the different thicknesses of material. Customarily the bearings as 13 which carry the upper roll 11 are arranged to be adjusted vertically in the frame members as 14, and through the medium of a linkage 22 attached to the bearing 13 such adjustment of the upper roll 11 to a position such as is indicated in broken lines in Fig. 1 also serves to position the thrust bearing 21 for the upper spindle 15 in such a manner that it may continue to support this spindle and thus relieve the universal coupling 17 of the major portion of any axial thrust which may be caused due to the weight of the spindle 15. The universal couplings 16 and 17 maintain driving connections between the upper spindle 15 and its associated roll 11 and the stub shaft 18 despite the lack of longitudinal alignment of these members when they are in positions such as are indicated by broken lines in Fig. 1.

As commonly constructed, each universal coupling as 16 or 17 comprises a female member 25 formed on or secured to an end of a spindle as 15. As shown in Figs. 2, 3 and 4, each female member 25 is bifurcated to receive a tongue or male member 26 provided on the adjacent end of a stub shaft as 18 or a pintle as 12 as the case may be. The bifurcation in the female member 25 is arcuately recessed as indicated at 27, and the outlines of such recesses cooperate to define a cylindrical opening extending through the female member 25 transversely with respect to the axis of the spindle 15. The female member is more deeply recessed at the central portion between the ends of the aforesaid cylindrical opening, as indicated at 28, than it is at 27, for a reason which will appear presently.

In order to transmit torque between the male and female members of the universal coupling, a pair of segmental slipper bearings generally designated 30 are interposed between these members, one such slipper bearing being disposed on each side of the tongue 26. Each slipper bearing as 30 has a medial boss portion 31 provided with a convex surface 32, Fig. 4, which is adapted to be located concentric with but spaced from the arcuate recess 28 in the female member 25 when the slipper bearings are assembled in the coupling. The bosses 31 are interconnected by a bearing pin 33 having reduced end portions 34 which are received in holes 35, Figs. 3 and 4, extending through the bosses 31. The tongue 26 of the coupling is bifurcated as indicated at 37, Figs. 2, 3 and 4, for receiving the pin 33, sufficient clearance being provided between the pin 33 and tongue 26 to permit assembly and operation thereof in their operative association.

Each slipper bearing is provided with end sections 40, Figs. 2 and 3, having convex surfaces as 41, Figs. 2 and 3, that are adapted to conform with the arcuate recesses 27 in the female members 25, and opposite these convex surfaces 41 said end sections 40 have flat faces 42 against which the faces of the tongue 26 may bear when torque is being transmitted by the universal coupling. The arcuate recesses 27 in the female member act as bearing surfaces with which the convex surfaces 41 of the slipper bearings cooperate when the slipper bearings are in service.

In the event that wear in the coupling reduces the effective depth of the recess or arcuate groove 28 there might be a tendency for the boss 31 to bottom in the groove 28 thereby preventing effective seating of the load transmitting end sections 40 against the surfaces 27 and to prevent such an objectionable relation the boss 31 and the ends 34 of the bearing pin 33 are normally arranged to be spaced appreciably from the bottom of the groove, as shown in Figs. 3 and 4. Depending upon the manner in which the male and female members 25 and 26 are being driven, one or the other of the end sections 40 is required to withstand substantially the entire stress acting upon each slipper bearing 30 in the course of exerting the torque required to overcome the load resistance. For example, assuming that the female member 25 shown in Fig. 3 is acting as the driving member and is being rotated in a counter-clockwise direction as viewed in Fig. 3, the tongue 26 tends to bear against only one of the end sections 40 of each slipper bearing 30 in the areas generally indicated by the two letters A in Fig. 3.

When the shafts on which the male and female members 26 and 25 are respectively formed or secured are not in alignment longitudinally, as is the case when the upper spindle 15 is in the broken-line position shown in Fig. 1, the slipper bearings 30 rock back and forth within the female member 25, Fig. 4, as the shafts are being rotated. In this regard it should be noted that there is also a tendency for the slipper bearings to shift longitudinally in alternate directions, Fig. 3, but in the present instance such movement is restrained by the end faces 43 of the bosses 31 abutting the shoulders as 44, Fig. 4, at the sides of the recess or arcuate groove 28. Due to the rubbing action of the more heavily stressed bearing end sections 40 against their cooperating bearing surfaces 27 in the female member 25, the wearing away of the material in these end sections and the cooperating portions of the female member is more rapid than in the case of the opposite end sections 40 and their cooperating surfaces 27. The greatest amount of wear takes place at the outward extremities of the more heavily stressed end sections 40, as indicated in a somewhat exaggerated manner by the dotted lines 27' in Fig. 3. Such wear is indicated in Fig. 3, upon only those surfaces which would be worn by counter-clockwise drive imparted by the female member 25.

Such uneven wearing away of the material forming the cooperating bearing surfaces in the universal coupling has a tendency to weaken the support afforded by the female member 25 to the more heavily stressed end sections of the slipper bearings, and hence the impressed load tends to press the stressed ends 40 of the two slipper bearings into positions conforming with the worn female surfaces such as the surfaces indicated at 27'. Thus each bearing 30 tends to rock about or to bend at a relatively indeterminate point on the load transmitting surface 27', such, for example, as the point B, Fig. 3, and in prior universal couplings this action has caused bending strains to be set up in the slipper bearings so as to cause the more heavily stressed end sections of such slipper bearings to break off and possibly be thrown out of the coupling due to the centrifugal forces. As hereinabove stated, it is the object of my invention to circumvent this undesirable condition, and to this end I have in the present instance resorted to a construction and arrangement whereby the requisite re-adjustment of the slipper bearings may take place as required and without the production of the aforesaid bending strains which have been responsible in a large measure for breakage of the one-piece slipper bearings heretofore employed in universal couplings.

In accordance with the present invention such readjustment of the slipper bearings is rendered possible through the provision of resilient supporting means which permits shifting movement of the slipper bearings 30 with relation to the bearing pin 33 as required to produce proper seating of the stressed ends 40 of the slipper bearings against worn bearing surfaces such as the surfaces 27'. This end is attained by a resilient mounting means interposed between the pin ends 34 and the bore or socket 35 and a cooperating resilient means interposed between the slipper bearings and the spacing shoulders 49 of the bearing pin 33. The first of these two cooperating means comprises, as herein shown, a resilient sleeve 50 made from a suitable material such as rubber and surrounding each pin end 34 within the socket 34. The second of these cooperating means has as a primary function the attainment of a proper spaced relation between the two slipper bearings 30, it being desirable to maintain the arcuate surfaces 41 of the slipper bearings relatively close to or in actual engagement with the bearing surfaces 27. Thus the second of the cooperating means as herein shown comprises a resilient conical washer 51 associated with each end 34 of the pin 33 in surrounding relation so that one end bears against the adjacent shoulder 49 while the other end acts to urge the associated slipper bearing longitudinally of the pin 33 and toward the related female bearing surfaces.

Thus when an impressed torque load in a coupling tends to rock or bend the slipper bearings at points such as the points B, Fig. 3, the boss sections 31 may move toward each other to thereby compress the resilient washers 51. During such shifting of the boss sections toward each other the small end of the conical washer 51 will first be pressed into the resilient end of the sleeve 50 against which it is seated, but after a slight movement the adjacent corner or end edge of the opening 35 will seat upon the washer 51 and thereafter the approaching movement of the bosses 31 will result in compression of the resilient conical washer 51. As an incident to such approaching movement of the bosses 31 the axes of the two sockets or bores 35 are shifted out of their original concentric relationship to the axis of the pin 33, such shifting being permitted by the interposed resilient mounting sleeves 50. To avoid binding of the boss 31 within the groove 28 when the slipper bearing is thus canted the boss 31 is made of such a width that a relatively small clearance is provided between the faces 43 thereof and the shoulders 44 of the groove 28. Thus proper positioning and spacing of the slipper bearings is assured normally by the resilient means 50 and 51, while these two means cooperate, when abnormal wear conditions are encountered, to avoid the production of objectionable bending or breaking stresses in the slipper bearings. This desirable result follows whether the slipper bearings are of one-piece type herein shown or of the multiple part construction shown and claimed in my copending application Serial No. 412,750, filed September 29, 1941.

From the foregoing it will be apparent that I have provided a slipper bearing structure in which the cushioned mounting of the slipper bearings 30 on the bearing pin 33 enables the slipper bearings to adjust themselves to the configuration of the bearing surfaces in the female member 25 in such a manner as to minimize the strains and shocks to which the bearings are ordinarily subjected while in service, thereby prolonging the useful life thereof. Moreover, the slipper bearings of the present invention are of a simple and economical construction which enables relatively rigid or one-piece slipper bearings to be used economically and effectively even where badly worn coupling members are encountered.

Thus, while I have illustrated and described a selected embodiment of my invention, it is to be understood that this is capable of variation and modification and I therefore do not wish to be limited to the precise details set forth but desire to avail myself of such changes and alterations as fall within the purview of the following claims.

I claim:

1. In a universal coupling including a bifurcated female member and a male member comprising a flat tongue adapted to be received in such bifurcation and which tongue has an opening therein for the reception of a bearing pin and wherein the branches of the bifurcation have opposed arcuate recesses therein that extend transversely and to the free edges thereof, the combination of a pair of slipper bearings respectively disposed in the arcuate recesses and including convex faces to conform with the recesses and also having flat faces respectively disposed toward opposed flat faces of said tongue, a bearing pin passing through the opening in said tongue and joining said slipper bearings, and yieldable means interposed at the junctions of said pin and said slipper bearings to enable said bearings to adjust themselves to the cooperating surfaces of said female member.

2. In a universal coupling including a bifurcated female member and a male member comprising a flat tongue adapted to be received in such bifurcation and which tongue has an opening therein for the reception of a bearing pin and wherein the branches of the bifurcation have opposed arcuate recesses therein that extend transversely and to the free edges thereof, the combination of a pair of slipper bearings respectively disposed in the arcuate recesses and including the convex faces to conform with the recesses and also having flat faces respectively disposed toward opposed flat faces of said tongue, a bearing pin extended through the opening in said tongue and into said slipper bearings and having bearing shoulders facing in opposite directions toward said bearings, said slipper bearings having openings formed therein to receive the end portions of said pin, resilient sleeves respectively disposed in the openings in said slipper bearings about the end portions of said pin and resilient means acting between said shoulders and said bearings to space the bearings apart and cooperate with said resilient sleeves to cushion said pin and to enable said bearings to become adjusted to the cooperating surfaces of said female member.

3. In a universal coupling including a bifurcated female member and a male member comprising a flat tongue adapted to be received in such bifurcation and which tongue has an opening therein for the reception of a bearing pin and wherein the branches of the bifurcation have opposed arcuate recesses therein that extend transversely and to the free edges therof, the combination of a pair of slipper bearings respectively disposed in the arcuate recesses and including the convex faces to conform with the recesses and also having flat faces respectively disposed toward opposed flat faces of said tongue, a bearing pin extended through the opening in said tongue and into said slipper bearings and having bearing shoulders facing in opposite directions toward said bearings, said slipper bearings having openings formed therein to receive the end portions of said pin, resilient sleeves interposed between said end portions of said pins and the openings in which they are received, and resilient cone washers respectively disposed in surrounding relation to said pin ends and acting between said shoulders and the adjacent slipper bearings to yieldingly urge said bearings apart.

4. In a universal coupling including a bifurcated female member and a male member comprising a flat tongue adapted to be received in such bifurcation and which tongue has an opening therein for the reception of a bearing pin and wherein the branches of the bifurcation have opposed arcuate recesses therein that extend transversely and to the free edges thereof, the combination of a pair of slipper bearings respectively disposed in the arcuate recesses and including convex faces to conform with the recesses and also having flat faces respectively disposed toward opposed flat faces of said tongue, each of said slipper bearings comprising a medial boss portion and two end sections extending in opposite directions from said boss longitudinally of such bearing, a bearing pin passing through the opening in said tongue and joining the bosses of said slipper bearings, and resilient means connecting said bosses to their respective ends of said bearing pin and enabling relative movement of the parts interconnected thereby while yieldingly urging said slipper bearings away from each other and toward a perpendicular relationship to said bearing pin.

5. In a universal coupling including a bifurcated female member and a male member comprising a flat tongue adapted to be received in such bifurcation and which tongue has an opening therein for the reception of a bearing pin and wherein the branches of the bifurcation have opposed arcuate recesses therein that extend transversely and to the free edges thereof, the combination of a pair of slipper bearings respectively disposed in the arcuate recesses and including convex faces to conform with the recesses and also having flat faces respectively disposed toward opposed flat faces of said tongue, each of said slipper bearings comprising a medial boss portion and two end sections relatively rigidly related to and extending in opposite directions from said boss longitudinally of such bearing, a bearing pin passing through the opening in said tongue, and resilient mounting means interposed between said bosses and said pin to urge said slipper bearing yieldingly away from each other and tending yieldingly to maintain said slipper bearings in a substantially perpendicular relationship to said pin.

6. A slipper bearing for use in a universal coupling of the character described and comprising a boss portion and two relatively rigidly related end sections respectively disposed on opposite sides of said boss and extending therefrom, said boss portion having a socket formed therein, and a resilient sleeve disposed within said socket and adapted to embrace one end of a bearing pin to resiliently associate the slipper bearing with such a bearing pin.

7. A slipper bearing for use in a universal coupling of the character described and comprising a boss portion and two relatively rigidly related end sections respectively disposed on opposite sides of said boss and extending therefrom, said boss portion having a socket formed therein, and resilient means carried by said slipper bearing and disposed to engage at least those side surfaces of one end of a bearing pin which are nearest to the ends of said slipper bearing when such a bearing pin is inserted in said socket to thereby resiliently associate the slipper bearing with such bearing pin.

THOMAS J. HEALY.